US007775118B2

(12) United States Patent
Casey et al.

(10) Patent No.: US 7,775,118 B2
(45) Date of Patent: Aug. 17, 2010

(54) SENSOR ELEMENT ASSEMBLY AND METHOD

(75) Inventors: Gary L. Casey, Thousand Oaks, CA (US); Marcos Nassar, Los Angeles, CA (US); Nhan Nguyen, Simi Valley, CA (US)

(73) Assignee: Custom Sensors & Technologies, Inc., Moorpark, CA (US)

( * ) Notice: Subject to any disclaimer, the term of this patent is extended or adjusted under 35 U.S.C. 154(b) by 355 days.

(21) Appl. No.: 12/109,275

(22) Filed: Apr. 24, 2008

(65) Prior Publication Data

US 2009/0266172 A1 Oct. 29, 2009

(51) Int. Cl.
*G01L 9/12* (2006.01)
(52) U.S. Cl. .................. 73/724; 73/715; 361/283.4
(58) Field of Classification Search .......... None
See application file for complete search history.

(56) References Cited

U.S. PATENT DOCUMENTS

| 3,948,102 A | 4/1976 | Coon |
| 4,151,578 A * | 4/1979 | Bell .................. 361/283.4 |
| 4,158,217 A | 6/1979 | Bell |
| 4,158,756 A * | 6/1979 | Keezer .................. 381/433 |
| 4,340,409 A | 7/1982 | Brooks |
| 4,533,798 A * | 8/1985 | Yatchum et al. ......... 200/11 R |
| 4,726,233 A * | 2/1988 | Eckardt et al. ............ 73/727 |
| 6,058,781 A | 5/2000 | Kusuyama |
| 2002/0123669 A1 | 9/2002 | Wickstrom |
| 2003/0167850 A1 | 9/2003 | Shiguro |
| 2005/0217384 A1 | 10/2005 | Gajdeczko |

FOREIGN PATENT DOCUMENTS

JP       03009232 A   *   1/1991

* cited by examiner

*Primary Examiner*—Lisa M Caputo
*Assistant Examiner*—Jermaine Jenkins
(74) *Attorney, Agent, or Firm*—Townsend and Townsend and Crew LLP

(57) ABSTRACT

Described herein is the sense element assembly for a capacitive pressure sensor and method for creating same that has increased sensitivity without additional size. The sense element assembly and method includes fabricating an off-centered elliptically shaped center electrode, at least one elliptical annular-like electrode around the center electrode, a ground electrode and a method for fusing the layers together to optimize sensitivity.

13 Claims, 3 Drawing Sheets

SENSOR ELEMENT ASSEMBLY AND METHOD

FIELD OF THE INVENTION

The present invention relates generally to capacitive pressure sensors and more specifically to sense element assemblies and methods of creating same for capacitive pressure sensors.

BACKGROUND OF THE INVENTION

Ceramic capacitive pressure sensors are well known in the art. In order to maintain maximum deflection with a minimal amount of bending stress, capacitive sensors generally use circular diaphragms centered in circular housings and two electrodes. The first electrode, which responds to pressure changes, will be referred to throughout as the "CP" electrode. The second electrode, which is the reference electrode, will be referred to as the "CR" electrode. The housings usually also contain the electrical connections necessary to activate the diaphragm electrodes.

Thus, it is desirable to create a pressure sensor containing a sensor assembly that has maximized deflection with minimal bending stress, detects large gradients of pressure, and is easy to fabricate.

SUMMARY OF THE PREFERRED EMBODIMENTS

In the present invention, a capacitive pressure sensor element assembly is provided having a substrate assembly and a diaphragm assembly. The substrate assembly comprises a substrate onto which a first electrode and second electrode is fabricated. The first electrode is elliptically shaped and has a first conductive terminal. The second electrode is substantially annular and elliptically shaped and surrounds the first electrode. The second electrode has a second conductive terminal. The diaphragm assembly comprises a diaphragm onto which a ground electrode is fabricated, the ground electrode having a ground conductive terminal. The diaphragm assembly and the substrate assembly are sealed together to form the sensor element assembly.

In the preferred embodiment, the first and second electrodes are fabricated so that they are located off-center on the substrate.

According to another aspect of the present invention, there is provided a method for fabricating the pressure sense element assembly. The method comprises assembling the substrate by printing CP and CR electrodes onto a substrate, drying and firing the electrodes, printing a frit on top of the substrate, drying the frit; assembling the diaphragm by printing the common/ground electrode, drying and firing the electrode, printing a frit onto the diaphragm, drying the frit. In the method of the present invention, it does not matter which of the assemblies—either the substrate assembly or the diaphragm assembly is manufactured first. However, the method of the present invention calls for firing the frit of one of the assemblies prior to aligning the substrate assembly with the diaphragm assembly and fusing them together to create the sensor assembly.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

In the following descriptions of the invention, terms such as "front," "back," "top," "bottom," "side," and the like are used herein merely for ease of description and refer to the orientation of the components as shown in the Figures.

Figure 1:
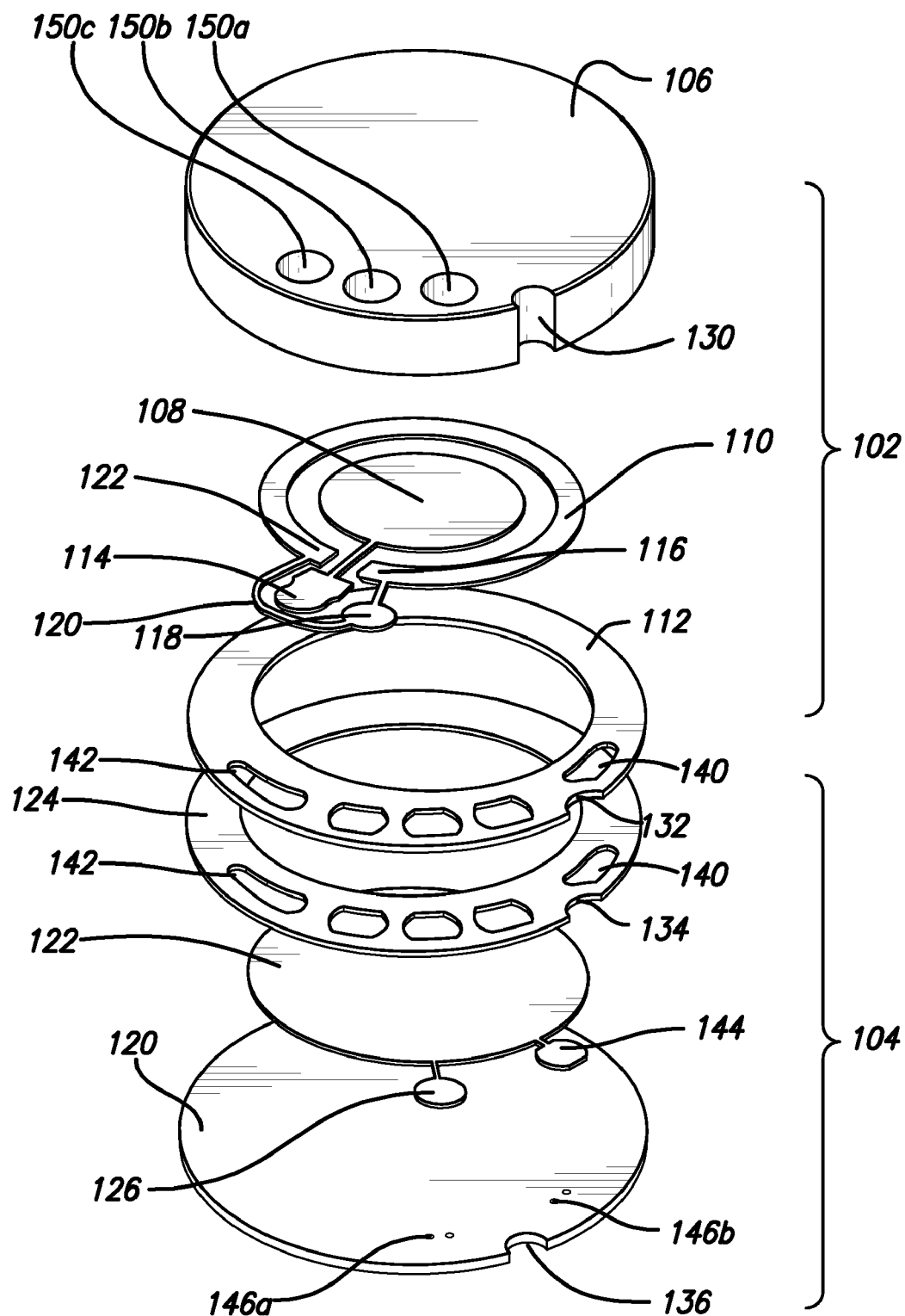
FIG. 1 is an exploded perspective view of the integrated pressure sensor element assembly in accordance with an embodiment of the present invention.
Figure 2:
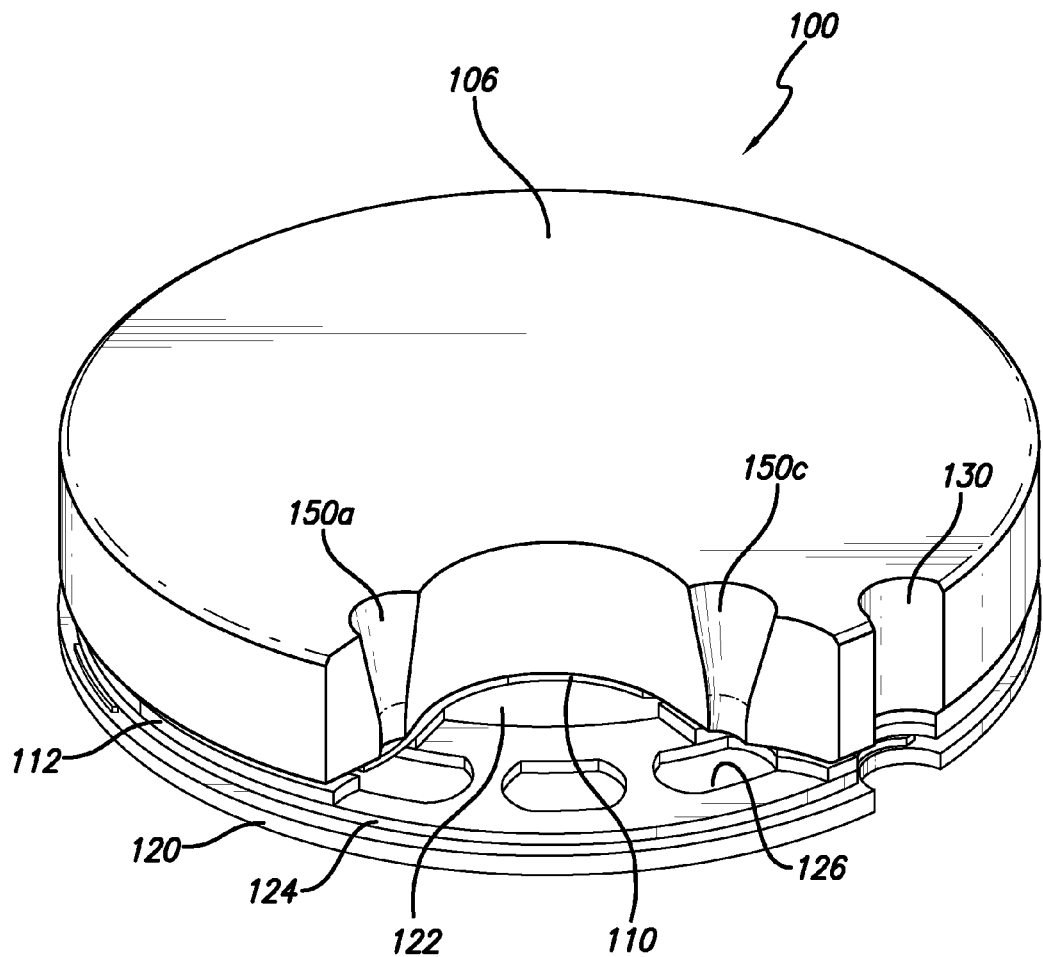
FIG. 2 is a partial cutaway side perspective view of the integrated pressure sensor element assembly of FIG. 1.

Generally, the present invention may be briefly described as follows. Referring first to FIGS. 1 and 2, a preferred embodiment of an integrated pressure sense element assembly 100 of the present invention is shown.

The sense element assembly 100 comprises two assemblies—a substrate assembly 102 and a diaphragm assembly 104. The substrate assembly comprises a substrate 106, a CP electrode 108, a CR electrode 110 and a sealing layer 112. In a preferred embodiment, the sealing layer 112 is a frit. However, any other material that provides a hermetic seal and provides for thermal expansion can be used.

Figure 3:
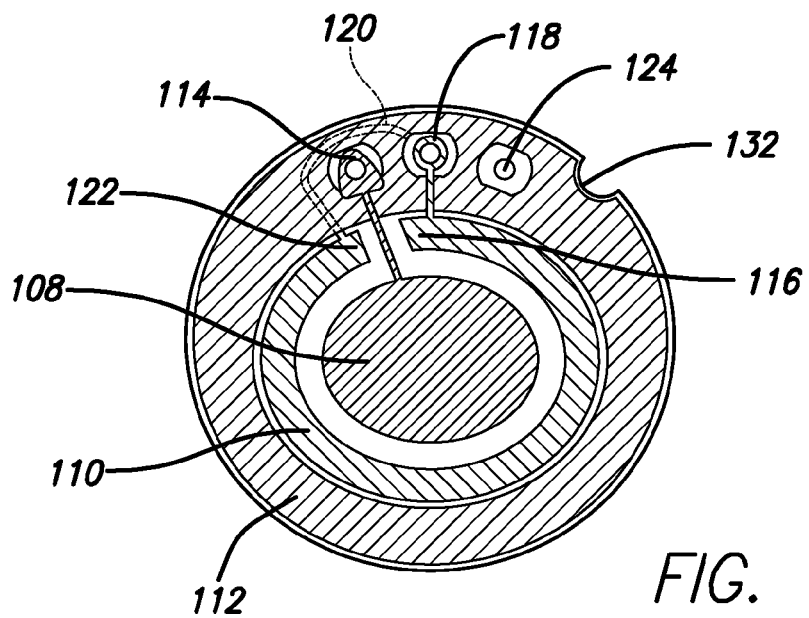
FIG. 3 is a cross-sectional plan view of the substrate assembly of pressure sensor element assembly of FIG. 1.
Figure 4:
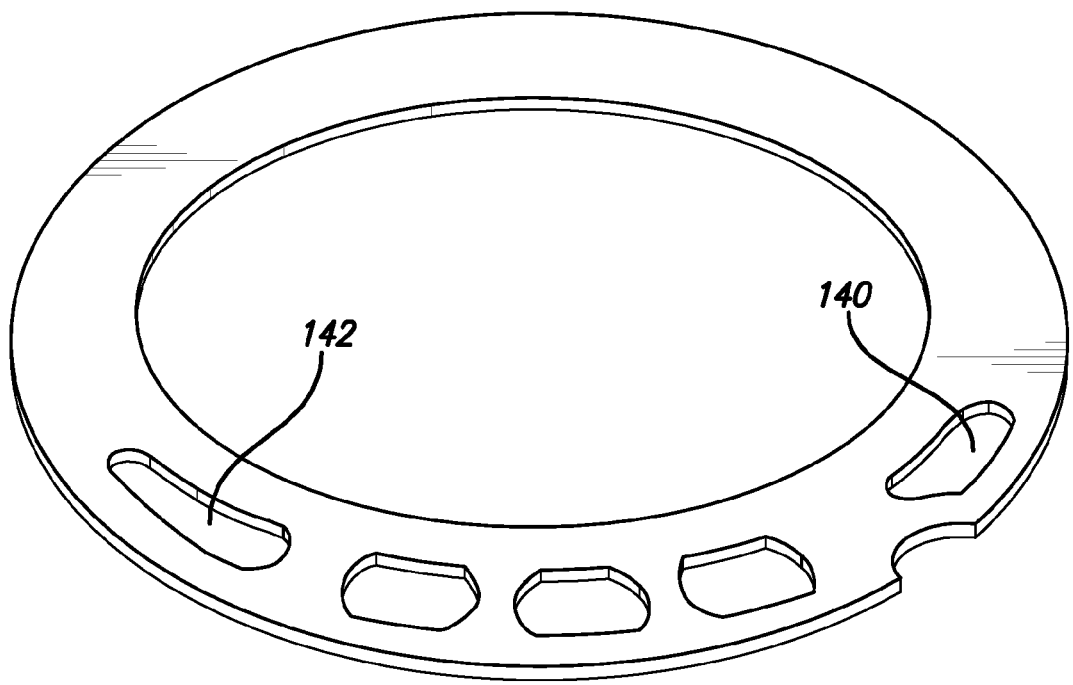
FIG. 4 is a perspective view of the frit layer of the diaphragm assembly portion of the pressure sensor element assembly of FIG. 1.

The CP electrode 108 is preferably elliptical in shape as shown more fully in FIG. 3 and is connected to CP terminal 114. The CR electrode 110 is also preferably elliptical in shape and is substantially an annular ring surrounding the CP electrode 108 as shown in FIGS. 1 and 3. In a preferred embodiment, the CR electrode 110 is C-shaped. However, the CR electrode 110 may be a complete annulus surrounding the CP electrode 108 providing that there is an electrical connection possible directly with the CP electrode 108 without touching the CR electrode 110.

The CR electrode 110 is connected on one end 116 to a CR terminal 118. The CP electrode 108 is connected to the CP terminal 114 by a conductor which extends from the CP electrode 108 and through the gap between the two ends 116 and 122 of the CR electrode 110. In a preferred embodiment, a guard electrode 120 is provided which is connected from CR terminal 118 around CP terminal 114 to end 122 of the CR electrode 108. The reason for this guard electrode 120 is to protect, or isolate the CP electrode that when the sensor is operational, there should be no temperature effect that affects the relative capacitance of the CP 108 and CR 110 electrodes.

In an preferred embodiment in which a frit is used, the frit layer 112 will become di-electric after it is fired. Thus, it will respond to outside temperature changes by a change in the dielectric constant. Therefore, if the areas covered by the frit are different, as the temperature changes, the capacitances as measured at CP 108 and CR 110 electrodes will deviate from one another making the sensor less accurate. If the CR 110 and CP 108 electrodes have substantially the same area covered by the frit layer 112 then there will be very little capacitance deviation between the two electrodes. Thus, in a preferred embodiment a guard electrode 120 is placed around the terminal 114 of the CP electrode 108 to act as a shield so that the only capacitance that the CP electrode 108 will be exposed to will be the capacitance created by the CR electrode 110.

In addition, if the sensor is exposed to high frequency signals, without the guard electrode 120, terminal 118 would act like an antenna causing the sensitivity of the sensor to decrease. However, it is to be understood that the guard electrode 120 can be omitted.

As shown in FIG. 3, in a preferred embodiment of the present invention, the CP 108 and CR 110 electrodes are fabricated by printing the CP and CR electrodes onto the substrate 106 so that they are off center on the substrate 106. Because they are elliptical in shape, by placing them off center onto the substrate 106, the electrodes 108 and 110 can be fabricated on a larger area while still retaining sufficient space between the perimeter of the outer CR electrode 110 and the circumference of the substrate to be fused together. Thus, when the diaphragm 104 and the substrate 102 assemblies layers are fused together, there is still enough space for the sealing layer 112 so that an effective seal is still possible.

In a preferred embodiment, the elliptical electrodes are shaped such that the outer electrode 110 will provide essentially the same outside exposed area as the inner electrode 108. Further, in a preferred embodiment, the major diameter of the outer electrode 110 is no more than approximately twenty percent (20%) larger than the minor diameter so that the increase in stress caused by the non-circular shape will remain negligible but the sensitivity to pressure will be nearly increased proportionally to the increased size of the major diameter of the outer electrode. Accordingly, this configuration allows a more sensitive sensor assembly to be packaged in a smaller diameter housing.

The substrate assembly preferably is fabricated by printing the CP 108, CR 110 and guard 120 electrodes and the CR 118 and CP 114 terminals onto the substrate 106, drying and firing them, printing the sealing layer 112, drying the seal to drive off any volatile organic binders to leave a material that is approximately the consistency and hardness of chalk.

Referring again to FIGS. 1-3, the diaphragm assembly 104 is shown comprising a diaphragm 120, a ground electrode 122 having a terminal 126 connected thereto and a sealing layer 124. A shield electrode which is on the bottom of the diaphragm assembly is not shown.

In a preferred embodiment, the ground 122 and shield (not shown) electrodes and their terminals are fabricated by printing them onto the diaphragm 120 so that the electrodes are centered on the diaphragm 120 and correspond to the outer perimeter of the CR electrode 110. Thereafter, the electrodes are dried then fired. Once the electrodes have cooled, the sealing layer 124 is printed and dried to drive off any volatile organic binders to leave a material that is approximately the consistency and hardness of chalk.

The sense element 100 is completed when the substrate 102 and diaphragm 104 assemblies are fused together by aligning them along alignment notches 130 and 136 and then firing them so that the sealing layers 112 and 124 melt and fuse the assemblies 102 and 104 together. In a preferred method of the present invention, either the sealing layer 112 on the substrate assembly 102 or the sealing layer 124 on the diaphragm assembly 104 is fired prior to joining the assemblies together. The firing is done to partial completion so that the sealing layer will still have a coarse texture. After the sealing layer has cooled, the two assemblies 102 and 104 are then joined together by firing. This reduces the amount of outgassing during the joining process and it produces a stronger and less porous bond, reducing the chance of leakage in the final product.

In a preferred embodiment, the sealing layer 112 is non-symmetrical due to the elliptical shapes of the electrodes 108 and 110. Since the sealing layers 112 and 124 provide support for the both the diaphragm 120 and the substrate 106 during the firing process and control the final gap between the electrodes, the sealing layers 112 and 124 must be held as constant and uniform as possible. To overcome the lack of symmetry, the sealing layers 112 and 124 are fabricated so that they have gaps 140 and 142 to balance out each sealing area so as to improve slumping when the layers of the sensor assembly 100 are fused together. This way, the centroid of each of the sealing layers 112 and 124 are kept as close as possible to the geometric center of the diaphragm 120.

Another feature that is offered is the placement of an additional terminal 144 on the ground electrode. This way, it does not matter on which side of the diaphragm 120 that the ground electrode 122 is placed during fabrication so long as the shield electrode (not shown) is placed on the opposite side and they are connected through via holes 146a or 146b.

The substrate 106 is manufactured so that it has 3 holes 150a, b and c corresponding to terminals 114, 118, and 126 of the CP, CR and ground electrodes 108, 110 and 122, respectively. In addition, each of the sealing layers 112 and 124 also have holes therein which correspond to terminals 114, 118, and 124 of the CP, CR and ground electrodes. Once the assemblies are aligned to be fused together, the holes in the substrate 106 and in the sealing layers 112 and 124 are also aligned and filled with conductive epoxy to provide the necessary conduit for the electrical connections.

IT will be understood that in the present invention, the sensitivity of the sense element 100 will increase without having to increase the overall size of the housing.

Those skilled in the art will understand that this type of sensor can be used in the automotive, airplane, heating, ventilating, and air conditioning systems (HVAC) industries, among other applications.

The embodiments described above are exemplary embodiments of the present invention. Those skilled in the art may now make numerous uses of, and departures from, the above-described embodiments without departing from the inventive concepts disclosed herein. Thus, the construction of the embodiments disclosed herein is not a limitation of the invention. Accordingly, the present invention is to be defined solely by the scope of the following claims.

What is claimed is:

1. A sensor element for a capacitive sensor comprising:
a substrate assembly comprising:
a substrate having a center,
a first elliptically shaped electrode on the substrate having a first conductive terminal;
a second substantially annular elliptically shaped electrode surrounding and not touching the first electrode, and the second electrode having a second conductive terminal;
a diaphragm assembly comprising:
a diaphragm,
a ground electrode on the diaphragm having a ground conductive terminal;
wherein the substrate assembly is sealed to the diaphragm assembly.

2. The sensor element assembly of claim 1, wherein the first and the second electrodes are offset from the center of the substrate.

3. The sensor element assembly of claim 2 wherein the major diameters of the first and second electrodes are as large as possible while still retaining sufficient space between the perimeter of the second electrode and the perimeter of the substrate, wherein a good seal between the substrate assembly and the diaphragm assembly around the periphery thereof is created.

4. The sensor element assembly of claim 1 further comprising a shield extending from the second terminal around said first terminal.

5. The sensor element assembly of claim 1, wherein the first and second elliptical electrodes are shaped such that the major diameter of the second electrode will provide essentially the same outside seal width as the minor diameter of the second electrode.

6. The sensor element assembly of claim 1 further comprising at least one or more frits that cause a substantially symmetrical seal when the substrate and diaphragm assemblies are sealed together.

7. A method for fabricating a pressure sense element assembly for a capacitive pressure sensor, the method comprising the steps of:
   printing a first substantially elliptical electrode and a second substantially elliptical annular electrode onto a substrate,
   firing the electrodes,
   printing a first frit over the electrodes and substrate,
   drying the first frit;
   assembling a diaphragm by printing the common/ground electrode,
   firing the common/ground electrode,
   printing a second frit over the common/ground electrode and the diaphragm,
   drying the second frit; and
   firing the first or second frit; and
   fusing the diaphragm onto which the ground electrode has been fabricated to the substrate onto which the first and second elliptical electrodes have been fabricated to create the sensor assembly.

8. The method of claim 7 wherein the step of printing the electrodes onto the substrate comprises offsetting the first and second electrodes on the substrate.

9. The method of claim 7 further comprising creating a gap in the frit areas wherein the frit areas create a substantially symmetrical seal.

10. A sensor element for a capacitive sensor comprising:
    a substrate having a center, a first electrode off-center on the substrate having a first conductive terminal area;
    a second substantially annular electrode surrounding and not touching the first electrode, and the second electrode having a second conductive terminal area;
    a diaphragm,
    a ground electrode on the diaphragm having a ground conductive terminal; and
    one or more seals for sealing the substrate to the diaphragm.

11. The sensor element assembly of claim 10 wherein the major diameters of the first and second electrodes are as large as possible while still retaining sufficient space between the perimeter of the second electrode and the perimeter of the substrate to create a good seal when the substrate and the diaphragm are sealed together.

12. The sensor element assembly of claim 10 wherein the first and second electrodes are elliptically shaped.

13. The sensor element assembly of claim 10, wherein the first and second electrodes are shaped such that the major diameter of the second electrode will provide essentially the same outside seal width as the minor diameter of the second electrode.

* * * * *